(12) United States Patent
Nanba

(10) Patent No.: US 7,773,852 B2
(45) Date of Patent: Aug. 10, 2010

(54) VIDEO PROCESSING APPARATUS, VIDEO PROCESSING METHOD AND DVD VIDEO APPARATUS

(75) Inventor: Yousuke Nanba, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 1368 days.

(21) Appl. No.: 10/268,972

(22) Filed: Oct. 11, 2002

(65) Prior Publication Data

US 2003/0081931 A1    May 1, 2003

(30) Foreign Application Priority Data

Oct. 12, 2001  (JP)  ............................ P 2001-315921
Oct. 12, 2001  (JP)  ............................ P 2001-315922
Oct. 23, 2001  (JP)  ............................ P 2001-325353

(51) Int. Cl.
   *H04N 5/91* (2006.01)
   *H04N 7/26* (2006.01)
(52) U.S. Cl. .......................................... 386/46; 386/124
(58) Field of Classification Search ................... 386/16, 386/46
   See application file for complete search history.

(56) References Cited

U.S. PATENT DOCUMENTS

| | | | | |
|---|---|---|---|---|
| 6,462,746 | B1 * | 10/2002 | Min et al. | 345/545 |
| 6,753,928 | B1 * | 6/2004 | Gospel et al. | 348/569 |
| 2001/0052127 | A1 * | 12/2001 | Seo et al. | 725/55 |
| 2002/0080278 | A1 * | 6/2002 | Lee et al. | 348/576 |
| 2002/0149626 | A1 * | 10/2002 | Ozcelik et al. | 345/781 |
| 2003/0190136 | A1 * | 10/2003 | Yamamoto | 386/46 |

FOREIGN PATENT DOCUMENTS

| | | |
|---|---|---|
| JP | 7-274140 | 10/1995 |
| JP | 8-195968 | 7/1996 |
| JP | 8-275195 | 10/1996 |
| JP | 10-215409 | 8/1998 |
| JP | 11-46328 | 2/1999 |

OTHER PUBLICATIONS

"An Efficient Method for Detecting Shot Boundaries and Telops in MPEG2 Video." Takashi Satou, et al., Technical Report of IEICE, PRMU96-99 (Nov. 1996). The Institute of Electronics, Information and Communication Engineers.

* cited by examiner

*Primary Examiner*—Marsha D Banks Harold
*Assistant Examiner*—Oluwaseun A Adegeye
(74) *Attorney, Agent, or Firm*—Morgan, Lewis & Bockius LLP

(57) ABSTRACT

A video processing apparatus retrieves highlight data from video data of DVD video standards and analyzes its highlight data and acquires a display position of a highlight on a display screen. Further, the video processing apparatus analyzes predetermined on screen display data and acquires a display position of on screen display on the display screen. Then, the video processing apparatus displays the on screen display on the display screen so as not to overlap with menu items of a main menu screen on which the highlight is overlaid by controlling the display position of the on screen display so as to differ from the display position of the highlight.

5 Claims, 5 Drawing Sheets

VIDEO PROCESSING APPARATUS, VIDEO PROCESSING METHOD AND DVD VIDEO APPARATUS

BACKGROUND OF THE INVENTION

The present invention relates to a video processing apparatus, a video processing method and a DVD video apparatus for controlling OSD displayed on a display screen with the OSD overlaid on main video.

Conventionally, there has been implemented a DVD video apparatus in which in the case of reproducing DVD-Video (hereinafter called "DVD video"), MPEG video data, sub-picture data and highlight data are extracted from the DVD video and a main menu screen made of MPEG video and sub-pictures is displayed on a display screen and a highlight can be displayed with the highlight overlaid on plural selectable items of its main menu screen. Further, there has been implemented a television image receiving apparatus in which television video signals for parent screen and child screen and a caption signal are received from a television broadcast signal rather than the DVD video and child screen video and a caption are overlaid on parent screen video and are displayed on a display screen.

For example, when main video of the MPEG video is movie or concert video in the DVD video apparatus, the DVD video apparatus overlays a highlight properly on items such as chapter selection and caption selection which are selectable items of the main menu screen made of MPEG video and sub-pictures and displays the highlight on the display screen. Further, when such a DVD video apparatus receives an on screen display (hereinafter called "OSD") signal in response to operation directions by a user during display of the main menu screen, OSD is further overlaid on the main menu screen on which plural items on which the highlight is overlaid are displayed and is displayed on the display screen.

In the DVD video apparatus, when the OSD is further displayed with the OSD overlaid on the main menu screen on which plural items on which the highlight is overlaid are displayed, a display position of the OSD is fixed, so that a problem that the OSD is displayed with the OSD overlapping with any item of the main menu screen has arisen. For example, when a user attempts to adjust output sound volume in the case that the items such as chapter selection and caption selection are displayed on the main menu screen of a movie, a problem that a sound volume adjusting bar is displayed with the bar overlapping on any item on which the highlight is overlaid and it becomes difficult for the user to view the selectable items has arisen.

Similarly, further in the television image receiving apparatus, when OSD is further displayed with the OSD overlaid on the television video for parent screen on which the television video for child screen and the caption are displayed, a problem that the OSD is displayed with the OSD overlapping with the television video for child screen or the caption has arisen. As means for solving this problem, a technique for displaying OSD on a display screen without overlapping with the caption is disclosed in the Unexamined Japanese Patent Application Publication No. Hei7-274140 with regard to the television image receiving apparatus.

SUMMARY OF THE INVENTION

Therefore, an object of the invention is to provide a video processing apparatus, a video processing method and a DVD video apparatus for displaying OSD on a display screen without overlapping with items of a menu screen by displaying the OSD on the display screen without overlapping with a highlight, a sub-picture or items of a menu screen made of MPEG video during reproduction of DVD video.

A video processing apparatus of the invention is characterized by comprising highlight analysis section for retrieving highlight data from video data of DVD video standards and analyzing the highlight data and acquiring a display position of a highlight on a display screen, on screen display analysis section for analyzing predetermined on screen display data and acquiring a display position of on screen display on the display screen, and on screen display control section for controlling the display position of the on screen display acquired by the on screen display analysis section so as to differ from the display position of the highlight acquired by the highlight analysis section.

Here, the highlight data of video data of DVD video standards is, for example, data representing color, position and shape of a highlight showing a state of selection or non-selection of a selectable menu item in a main menu screen about main video of movie or music video works. That is, the highlight data is data representing a position of a highlight displayed with the highlight overlaid on a display position of the menu item of the main menu screen, and is not data representing a character. Further, on screen display data is font data of an adjusting bar of output sound volume, an adjusting menu of various video or compressed data.

According to the video processing apparatus of the invention, by the highlight analysis section, highlight data is retrieved from video data of DVD video standards and the highlight data is analyzed and a display position of a highlight on a display screen is acquired and by the on screen display analysis section, predetermined on screen display data is analyzed and a display position of on screen display on the display screen is acquired and by the on screen display control section, the display position of the on screen display acquired by the on screen display analysis section is controlled so as to differ from the display position of the highlight acquired by the highlight analysis section.

Further, a video processing method of the invention is characterized by comprising the steps of retrieving highlight data from video data of DVD video standards and analyzing the highlight data and acquiring a display position of a highlight on a display screen, analyzing predetermined on screen display data and acquiring a display position of on screen display on the display screen, and controlling the display position of the on screen display so as to differ from the display position of the highlight.

Therefore, according to the video processing apparatus and the video processing method, by analyzing the highlight data having position data of the highlight, the on screen display can be displayed on the main menu screen without overlapping with the menu item easily more than analyzing MPEG video data or sub-picture data having character data of the menu item of the main menu screen on which the highlight is overlaid. Thus, even when the on screen display of a sound volume adjusting bar is displayed in the case that a menu item such as chapter selection or caption selection is displayed on a main menu screen of a movie, without the fact that the sound volume adjusting bar overlaps with the menu item and it becomes difficult for a user to view the menu item, an easy-to-view display screen can be provided for the user by simpler processing.

Further, a video processing apparatus of the invention is constructed so that the highlight analysis section analyzes the highlight data and acquires a display position of a highlight every display area in which the display screen is divided into plural display areas, and the on screen display analysis section analyzes the on screen display data and acquires a display position of on screen display every the display area, and the on screen display control section changes the display area of the display position of the on screen display to the display area different from the display area of the display position of the highlight.

Therefore, according to the video processing apparatus, since the display positions of the highlight and the on screen display are respectively acquired every the display area and the display position of the on screen display can be changed every the display area so that the on screen display does not overlap with the highlight, acquisition processing and change processing of the display position can be performed more easily and rapidly. Thus, even when the on screen display is frequently displayed on the main menu screen having the menu item on which the highlight is overlaid, the display position of the on screen display can be set rapidly and an easy-to-view display screen can always be provided for a user.

Further, a video processing apparatus of the invention is constructed so that the on screen display control section changes the display area of the on screen display to the display area different from the display area of the highlight according to priority respectively associated with the plural display areas.

Therefore, according to the video processing apparatus, by previously assigning priority to the plural display areas on the display screen in consideration of a frequency with which the highlight is displayed every display area, the display area of the on screen display can be changed more easily and rapidly so that the on screen display does not overlap with the highlight, that is, the on screen display does not overlap with the menu item of the main menu screen.

Further, a DVD video apparatus of the invention is characterized by comprising a decoder for decoding video and audio data of DVD video standards and generating a video signal and an audio signal, video display section for displaying various video based on the video signal in a predetermined position on a display screen, audio output section for outputting various audio based on the audio signal, the video processing apparatus described above, and on screen display section for displaying on screen display in a display position on the display screen controlled by the on screen display control section while overlaying the on screen display on various video based on the video signal.

Therefore, according to the DVD video apparatus, by analyzing the highlight data having position data of the highlight, the on screen display can be displayed on the main menu screen without overlapping with the menu item easily more than analyzing MPEG video data or sub-picture data having character data of the menu item of the main menu screen on which the highlight is overlaid. Thus, an easy-to-view display screen can be provided for a user by simpler processing.

Further, a video processing apparatus of the invention is characterized by comprising sub-picture analysis section for retrieving sub-picture data from video data of DVD video standards and analyzing the sub-picture data and acquiring a display position of a sub-picture on a display screen, on screen display analysis section for analyzing predetermined on screen display data and acquiring a display position of on screen display on the display screen, and on screen display control section for controlling the display position of the on screen display acquired by the on screen display analysis section so as to differ from the display position of the sub-picture acquired by the sub-picture analysis section.

Here, the sub-picture data of video data of DVD video standards is, for example, data in which characters of a caption or superimposition of movie or music video works are represented by a run-length code. Further, on screen display data is font data of an adjusting bar of output sound volume, an adjusting menu of various video or compressed data.

According to the video processing apparatus of the invention, by the sub-picture analysis section, sub-picture data is retrieved from video data of DVD video standards and the sub-picture data is analyzed and a display position of a sub-picture on a display screen is acquired and by the on screen display analysis section, predetermined on screen display data is analyzed and a display position of on screen display on the display screen is acquired and by the on screen display control section, the display position of the on screen display acquired by the on screen display analysis section is controlled so as to differ from the display position of the sub-picture acquired by the sub-picture analysis section.

Further, a video processing method of the invention is characterized by comprising the steps of retrieving sub-picture data from video data of DVD video standards and analyzing the sub-picture data and acquiring a display position of a sub-picture on a display screen, analyzing predetermined on screen display data and acquiring a display position of on screen display on the display screen, and controlling the display position of the on screen display so as to differ from the display position of the sub-picture.

Therefore, according to the video processing apparatus and the video processing method, the display position of the on screen display can be controlled based on the display position of the sub-picture, so that the on screen display can be displayed on the display screen without overlapping with the sub-picture. Thus, even when the on screen display of a sound volume adjusting bar is displayed on the display screen on which a sub-picture such as a caption of a movie is displayed, without the fact that the sound volume adjusting bar overlaps with the caption and a user cannot read the caption, an easier-to-view display screen can be provided for the user.

Further, a video processing apparatus of the invention is constructed so that the sub-picture analysis section analyzes the sub-picture data and acquires a display position of a sub-picture every display area in which the display screen is divided into plural display areas, and the on screen display analysis section analyzes the on screen display data and acquires a display position of on screen display every the display area, and the on screen display control section changes the display area of the display position of the on screen display to the display area different from the display area of the display position of the sub-picture.

Therefore, according to the video processing apparatus, since the display positions of the sub-picture and the on screen display are respectively acquired every the display area and the display position of the on screen display can be changed every the display area so that the on screen display does not overlap with the sub-picture, acquisition processing and change processing of the display position can be performed more easily and rapidly. Thus, even when the on screen display is frequently displayed on the display screen on which the sub-picture is displayed, the display position of the on screen display can be set rapidly and an easy-to-view display screen can always be provided for a user.

Further, a video processing apparatus of the invention is constructed so that the on screen display control section changes the display area of the on screen display to the display area different from the display area of the sub-picture according to priority respectively associated with the plural display areas.

Therefore, according to the video processing apparatus, by previously assigning priority to the plural display areas on the display screen in consideration of a frequency with which the sub-picture is displayed every display area, the display area of the on screen display can be changed more easily and rapidly so that the on screen display does not overlap with the sub-picture.

Further, a DVD video apparatus of the invention is characterized by comprising a decoder for decoding video and audio data of DVD video standards and generating a video signal and an audio signal, video display section for displaying various video based on the video signal in a predetermined position on a display screen, audio output section for outputting various audio based on the audio signal, the video processing apparatus described above, and on screen display section for displaying on screen display in a display position on the display screen controlled by the on screen display control section while overlaying the on screen display on various video based on the video signal.

Therefore, according to the DVD video apparatus, the display position of the on screen display can be controlled based on the display position of the sub-picture, so that the on screen display can be displayed on the display screen without overlapping with the sub-picture. Thus, an easier-to-view display screen can be provided for a user.

Still further, a video processing apparatus of the invention is characterized by comprising MPEG video analysis section for retrieving MPEG video data from video data of DVD video standards and analyzing said MPEG video data and acquiring a display position of a mark on a display screen, on screen display analysis section for analyzing predetermined on screen display data and acquiring a display position of on screen display on the display screen, and on screen display control section for controlling the display position of the on screen display acquired by the on screen display analysis section so as to differ from the display position of the mark acquired by the MPEG video analysis section.

Here, the MPEG video data of video data of DVD video standards is data in which main video of movie or music video works and a main menu screen having plural menu items, other marks such as a title and various background images about the main video are compressed by MPEG. Further, the mark acquired by analyzing the MPEG video data includes menu items, various marks such as a title, numbers and signs, and pictures of background images of the main menu screen. Further, on screen display data is font data of an adjusting bar of output sound volume, an adjusting menu of various video or compressed data.

According to the video processing apparatus of the invention, by the MPEG video analysis section, MPEG video data is retrieved from video data of DVD video standards and said MPEG video data is analyzed and a display position of a mark on a display screen is acquired and by the on screen display analysis section, predetermined on screen display data is analyzed and a display position of on screen display on the display screen is acquired and by the on screen display control section, the display position of the on screen display acquired by the on screen display analysis section is controlled so as to differ from the display position of the mark acquired by the MPEG video analysis section.

Further, a video processing method of the invention is characterized by comprising the steps of retrieving MPEG video data from video data of DVD video standards and analyzing said MPEG video data and acquiring a display position of a mark on a display screen, analyzing predetermined on screen display data and acquiring a display position of on screen display on the display screen, and controlling the display position of the on screen display so as to differ from the display position of the mark.

Therefore, according to the video processing apparatus and the video processing method, by analyzing the MPEG video data, a display position can be acquired further with respect to marks incapable of acquiring its display position from a display position of a highlight, so that the on screen display can be displayed on the main menu screen without overlapping with all the marks of the main menu screen. Thus, even when the on screen display of a sound volume adjusting bar is displayed in the case that a title and a menu item such as chapter selection or caption selection are displayed on the main menu screen of a movie, without the fact that the sound volume adjusting bar overlaps with the title or the menu item and it becomes difficult for a user to view them, an easy-to-view display screen can be provided for the user surely.

Further, a video processing apparatus of the invention is constructed so that the MPEG video analysis section analyzes the MPEG video data and acquires a display position of a mark every display area in which the display screen is divided into plural display areas, and the on screen display analysis section analyzes the on screen display data and acquires a display position of on screen display every the display area, and the on screen display control section changes the display area of the display position of the on screen display to the display area different from the display area of the display position of the mark.

Therefore, according to the video processing apparatus, since the display positions of the mark of MPEG video and the on screen display are respectively acquired every the display area and the display position of the on screen display can be changed every the display area so that the on screen display does not overlap with the mark of MPEG video, acquisition processing and change processing about the display positions of all the marks of the main menu screen can be performed more easily and rapidly without depending on a display position of a highlight capable of acquisition easily. Thus, even when the on screen display is frequently displayed on the main menu screen having the marks on which the highlight cannot be overlaid, the display position of the on screen display can be set rapidly based on the display positions of all the marks on the main menu screen and an easy-to-view display screen can always be provided for a user.

Further, a video processing apparatus of the invention is constructed so that the on screen display control section changes the display area of the on screen display to the display area different from the display area of the mark according to priority respectively associated with the plural display areas.

Therefore, according to the video processing apparatus, by previously assigning priority to the plural display areas on the display screen in consideration of a frequency with which the mark of MPEG video is displayed every display area, the display area of the on screen display can be changed more easily and rapidly so that the on screen display does not overlap with all the marks of the main menu screen.

Further, a video processing apparatus of the invention is constructed so that the MPEG video analysis section analyzes the MPEG video data and acquires color information about a background on the display screen, and the on screen display analysis section analyzes the on screen display data and acquires color information about the on screen display, and the on screen display control section changes the display position of the on screen display or the color information according to the color information about the background and the color information about the on screen display.

Here, the color information about the background acquired by analyzing the MPEG video data shows color in portions other than the marks of the main menu screen and by this color information, it can indicate which color or pattern a predetermined portion of the background is. Further, the color information about the on screen display acquired by analyzing the on screen display data shows color of marks of the on screen display.

Therefore, according to the video processing apparatus, even when color of the on screen display displayed on the main menu screen is color kindred to background color of the main menu screen in the vicinity of a display position in which the on screen display is displayed or a difficult-to-discriminate level of color similar to the background color, a display position of the on screen display can be changed to a display position having a background of color different from color of the on screen display, or color of the on screen display can be changed to color different from the background color. Thus, the on screen display can always be displayed on the main menu screen in a state in which a user can view easily.

Further, a DVD video apparatus of the invention is characterized by comprising a decoder for decoding video and audio data of DVD video standards and generating a video signal and an audio signal, video display section for displaying various video based on the video signal in a predetermined position on a display screen, audio output section for outputting various audio based on the audio signal, the video processing apparatus described above, and on screen display section for displaying on screen display in a display position on the display screen controlled by the on screen display control section while overlaying the on screen display on various video based on the video signal.

Therefore, according to the DVD video apparatus, by analyzing the MPEG video data, a display position can be acquired also with respect to marks incapable of acquiring its display position from a display position of a highlight, so that the on screen display can be displayed on the main menu screen without overlapping with all the marks of the main menu screen. Thus, an easy-to-view display screen can be provided for a user surely.

DETAILED DESCRIPTION OF THE PREFERRED EMBODIMENTS

Embodiment 1

A DVD (Digital Versatile Disc) player 1 in an embodiment to which the invention is applied preferably will be described below with reference to FIGS. 1 to 5.

The DVD player 1 of the present embodiment decodes video and audio data of DVD video standards to generate a video signal and an audio signal, and also retrieves and analyzes highlight data from the video data, and acquires a display position of a highlight on a display screen. Further, the DVD player 1 analyzes predetermined On Screen Display (hereinafter called "OSD") data, and acquires a display position of the OSD on the display screen. Then, the DVD player 1 controls the display position of the OSD so that the OSD is displayed in a position different from that of the highlight on the display screen based on the display position of the highlight and the display position of the OSD, and controls the display position of the OSD so that the OSD does not overlap with menu items on a main menu screen. Then, the DVD player 1 displays the OSD in the controlled display position on the display screen and also outputs various audio based on the audio signal while overlaying the OSD on various video such as the menu items based on the video signal.

Figure 1:
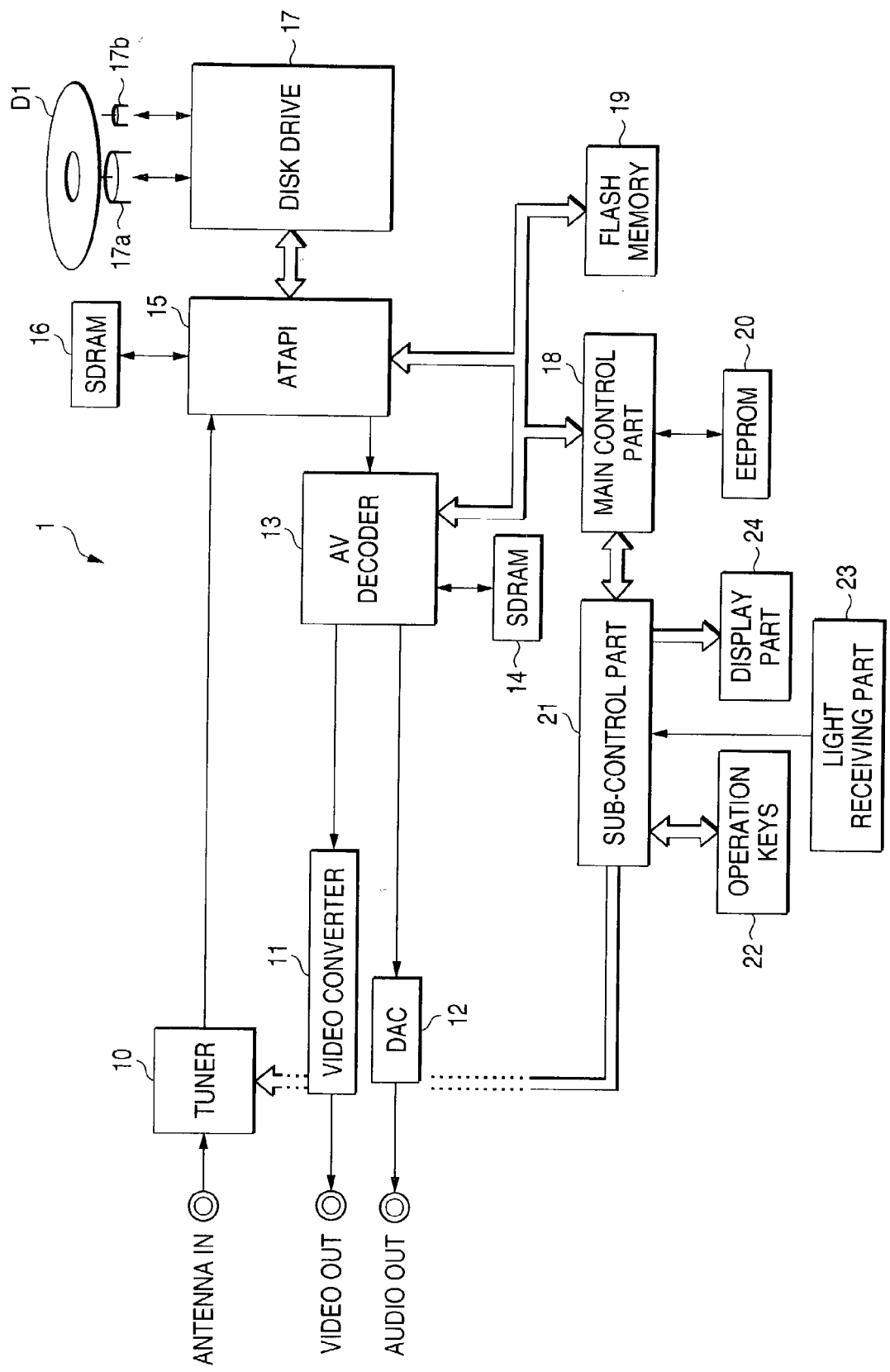
FIG. 1 is a block diagram showing an outline of the whole configuration of a DVD player 1 in an embodiment of the invention.

First, the whole configuration of the DVD player 1 in the embodiment of the invention will be described with reference to FIG. 1. FIG. 1 is a block diagram showing an outline of the whole configuration of the DVD player 1.

The DVD player 1 of the embodiment is an apparatus capable of reproducing movie or music video works and a main menu screen etc. about the works in conformance with DVD video standards. Further, this DVD player 1 is provided with an OSD function for displaying OSD of an adjusting bar of output sound volume and an adjusting menu of various video with the OSD overlaid on main video.

As shown in FIG. 1, the DVD player 1 of the embodiment comprises data processing system blocks of video and audio having a tuner 10, a video converter 11, a DA converter 12, an AV decoder 13, an SDRAM 14, an ATAPI 15, an SDRAM 16 and a disk drive 17. Further, the DVD player 1 comprises a main control part 18, flash memory 19, EEPROM 20, a sub-control part 21, operation keys 22, a light receiving part 23 and a display part 24.

The tuner 10 selects a preferable signal from among signals received by an antenna, and outputs the selected signal to the ATAPI 15 described below.

The video converter 11 converts an RGB video signal outputted from the AV decoder 13 described below into a luminance signal and a color signal of a predetermined format, and outputs the signal to a video output terminal.

The DA converter (hereinafter called "DAC") 12 converts a digital audio signal outputted from the AV decoder 13 described below into an analog audio signal, and outputs the signal to an audio output terminal.

Incidentally, the video output terminal and the audio output terminal are connected to a video display apparatus such as a television (not shown), and various video is displayed on a display screen of the video display apparatus based on the luminance signal and the color signal, and various audio is outputted from a speaker of the video display apparatus based on the analog audio signal.

The AV decoder 13 receives the video and audio data of DVD video standards read out by the disk drive 17 described below through the ATAPI 15. The video data of DVD video standards includes MPEG main video data in which main video of movie or music video works and a main menu screen about the main video are compressed by MPEG, sub-picture data in which various characters along with position information are represented by a run-length code, and highlight data representing color, position and shape of a highlight showing a state of selection or non-selection of selectable menu items of the main menu screen. Incidentally, characters of the selectable menu items of the main menu screen may be compressed by MPEG and converted into the MPEG main video data, or may be represented by a run-length code and converted into the sub-picture data. Thus, even when the characters of the selectable menu items of the main menu screen are the MPEG main video data or the sub-picture data, the highlight data has data of a position of a highlight matching with a display position of the menu item of the main menu screen and does not have data representing a character.

Then, the AV decoder 13 performs decoding processing with respect to their video and audio data, and generates an RGB video signal for displaying MPEG main video, a sub-picture and a highlight and an audio signal of a PCM (Pulse Code Modulation) format.

Further, when the AV decoder 13 receives display directions of OSD based on control of the main control part 18 described below, the AV decoder 13 performs decoding processing with respect to OSD data of font data of an adjusting bar of output sound volume stored in the flash memory 19 or an adjusting menu of various video or compressed data, and generates an RGB video signal for displaying the OSD. Incidentally, details will be described below, and even in the case that the OSD overlaps with the menu items when the menu items of the main menu screen and the OSD are displayed on the display screen of the video display apparatus as it is based on the generated RGB video signal (see FIG. 4), since the main control part 18 sets a display position of the OSD so that the OSD does not overlap with a highlight overlaid on the menu items, the AV decoder 13 generates an RGB video signal for displaying the OSD so as not to overlap with the highlight, that is, so as not to overlap with the menu items of the main menu screen.

Then, when the AV decoder 13 generates the RGB video signal, the AV decoder 13 outputs the generated RGB video signal to the video converter 11 and a digital audio signal to the DAC 12, respectively. Therefore, when the video converter 11 receives the RGB video signal and converts its RGB video signal into a luminance signal and a color signal of a predetermined format and outputs the signal to a video output terminal, various video is displayed on the display screen of the video display apparatus connected to the DVD player 1 through the video output terminal and the audio output terminal in order of MPEG main video, a sub-picture, a highlight and OSD as shown in FIG. 2.

Figure 2:
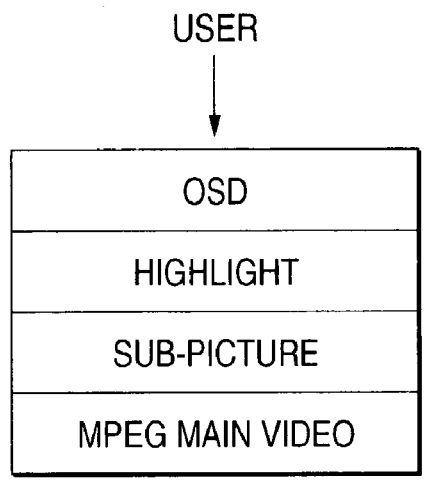
FIG. 2 is a diagram schematically showing data displayed on a display screen of a video display apparatus connected to the DVD player 1.

FIG. 2 is a diagram schematically showing data displayed on the display screen of the video display apparatus connected to the DVD player 1.

As shown in FIG. 2, when viewed from a user, based on the luminance signal and the color signal, the MPEG main video is first displayed on the display screen and the sub-picture is next displayed on the MPEG main video and the highlight is then displayed on the sub-picture and when there is the OSD, the OSD is then displayed on the sub-picture. Therefore, when a display position of the highlight overlaid on the menu items of the main menu screen which is the MPEG main video or the sub-picture overlaps with a display position of the OSD, a case that a part of the menu items located in the display position of the highlight with which the OSD overlaps becomes invisible due to the OSD occurs.

The SDRAM (Synchronous Dynamic Random Access Memory) 14 is memory for working used in the case that the AV decoder 13 performs various decoding processing.

Based on control of the main control part 18 described below, the ATAPI (AT Attachment Pachet Interface) 15 outputs a command for giving directions so as to read data from DVD video D1 to the disk drive 17, and reads the data read from the DVD video D1 by the disk drive 17 from the disk drive 17, and transfers its data to the AV decoder 13.

The SDRAM 16 is memory for working used in the case that the ATAPI 15 reads data from the disk drive 17.

The disk drive 17 has a disk motor 17a for rotating the DVD video D1 and a head part 17b for reading and writing data from the rotating DVD video D1.

The main control part 18 performs control of data processing system blocks of the video and audio mainly. That is, the main control part 18 controls the ATAPI 15 so that the ATAPI 15 reads video and audio data of the DVD video D1 from the disk drive 17 and transfers the data to the AV decoder 13. Further, the main control part 18 controls the AV decoder 13 so that the AV decoder 13 performs decoding processing with respect to the video and audio data and generates an audio signal and an RGB video signal for displaying MPEG main video, a sub-picture and a highlight.

Figure 3:
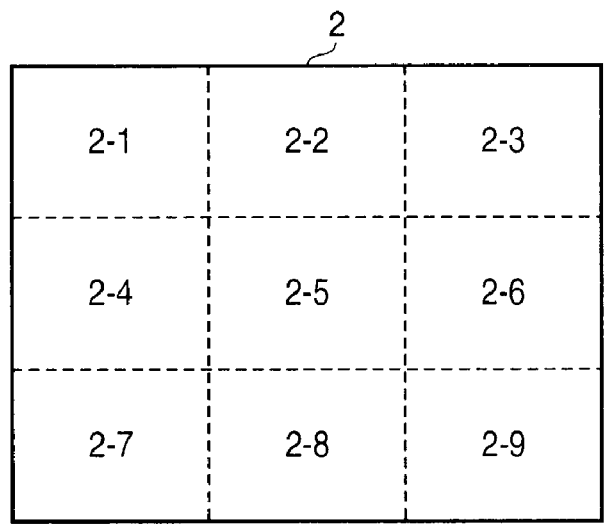
FIG. 3 is a screen example in which a display screen 2 of the video display apparatus connected to the DVD player 1 is divided into plural display areas.

Further, when the main control part 18 receives operation directions of OSD of a user through the sub-control part 21 described below and decides that data about the menu items of the main menu screen is included in the video and audio data, a display position of a highlight overlaid on the menu item is analyzed every display area as shown in FIG. 3. That is, the main control part 18 can estimate a display position of a character of the menu item on which the highlight is overlaid by analyzing the display position of the highlight. Further, the main control part 18 reads OSD data from the flash memory 19 and analyzes a display position of OSD every display area as shown in FIG. 3 in a manner similar to the case of analyzing the display position of the highlight.

Figure 4:
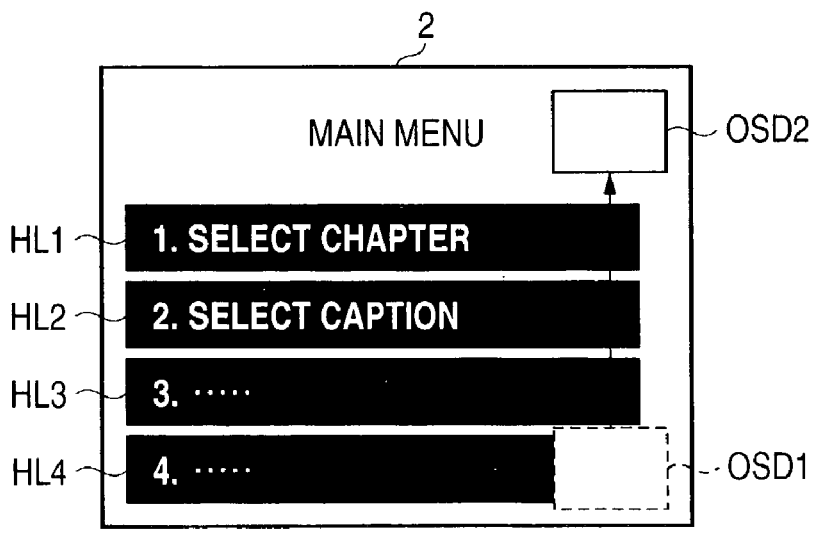
FIG. 4 is a screen example in which menu items of a main menu screen, highlights and OSD are displayed on the display screen 2 of the video display apparatus.

Then, when the main control part 18 decides that the OSD overlaps with the highlight as shown in FIG. 4 as a result of analyzing the display positions of the highlight and the OSD, it can be estimated that the OSD overlaps with the menu item on which the highlight is overlaid, so that the display position of the OSD is set every display area according to priority predetermined to each the display area as shown in FIG. 3 so that the OSD does not overlap with the highlight. Then, the main control part 18 controls the AV decoder 13 so that the AV decoder 13 performs decoding processing with respect to OSD data based on the display position of the OSD and generates an RGB video signal for displaying the OSD.

FIG. 3 is a screen example in which a display screen 2 of the video display apparatus connected to the DVD player 1 is divided into plural display areas.

As shown in FIG. 3, in the embodiment, the display screen 2 of the video display apparatus for displaying various video generated by the DVD player 1 is divided into nine display areas for ease in analyzing a display position of each display target, and any number of 2-1 to 2-9 is associated with each of the display areas. Then, as described above, in order to estimate a display position of a menu item of a main menu screen on which a highlight is overlaid, the main control part 18 analyzes which display area of the display screen 2 the highlight is present in. Similarly, in order to analyze a display position of OSD, the main control part 18 analyzes which display area of the display screen 2 the OSD is present in.

Further, priority is previously associated with each of the display areas of the display screen 2 for ease in setting the display position of the OSD. For example, the highest priority is assigned to the display area 2-9, and the second highest priority is assigned to the display area 2-3, and the third highest priority is assigned to the display area 2-6.

In the embodiment, the case that the display screen 2 of the video display apparatus is divided into the nine display areas and the display position of each the display target is analyzed every this divided display area has been described, but the display screen 2 may be divided into smaller display areas or may be divided into larger display areas. Further, in the embodiment, the case that the highest priority is assigned to the display area 2-9 and the second highest priority is assigned to the display area 2-3 and the third highest priority is assigned to the display area 2-6 has been described, but priority may be assigned to each the display area according to the target to be displayed.

FIG. 4 is a screen example in which menu items of a main menu screen, highlights and OSD are displayed on the display screen 2 of the video display apparatus.

As shown in FIG. 4, when the main control part 18 displays "1. Select chapter", "2. Select caption", "3. . . . " and "4. . . . " which are menu items on the display screen 2 on which a main menu screen "Main Menu" is displayed and can display highlights HL1, HL2, HL3 and HL4 with the highlights respectively overlaid on display positions of these menu items, display positions of the highlights HL1 to HL4 are analyzed as display areas 2-4 to 2-9. Further, in the case of attempting to display OSD1 which is OSD in the display area 2-9 with the highest priority on the display screen 2, the main control part 18 decides that the OSD1 overlaps with the highlights HL3 and HL4, and estimates that the OSD1 overlaps with the menu items "3. . . . " and "4. . . . ", and sets a display position of the OSD so as to display the OSD as OSD2 in the display area 2-3 with high priority next to that of the display area 2-9. Therefore, on the main menu screen of the display screen 2, the highlights HL1 to HL4 can be displayed in the display areas 2-4 to 2-9 and the OSD2 is displayed in the display area 2-3, so that the OSD2 does not overlap with the highlights HL1 to HL4 and a user can view all of the menu items on which the highlights are overlaid and the OSD.

The flash memory 19 shown in FIG. 1 stores OSD data such as font data or compressed data used in an OSD function of displaying an adjusting bar of output sound volume and an adjusting menu of various video. Then, the flash memory 19 outputs the stored OSD data to the AV decoder 13 based on control of the main control part 18.

The EEPROM (Electrically Erasable and Programmable Rom) 20 saves various setting data.

Based on control of the main control part 18, the sub-control part 21 controls signal selection by the tuner 10, input of an operation signal from an operation panel (not shown) comprising the operation keys 22 and the display part 24 described below, and output of a display signal to the operation panel.

The operation keys 22 are provided on the operation panel and comprise various operation keys capable of operation by a user. Then, when any operation key among the operation keys 22 is operated by the user, the operation keys 22 originate an operation signal corresponding to the operated operation key.

The light receiving part 23 receives the operation signal originated by operating the operation keys 22 by the user, and outputs the signal to the sub-control part 21.

The display part 24 is provided on the operation panel and when a display signal outputted by the sub-control part 21 according to the operation signal is received, the operation contents are displayed based on the received display signal.

Next, display position control processing of OSD executed by the DVD player 1 in the embodiment will be described according to a flowchart shown in FIG. 5.

Figure 5:
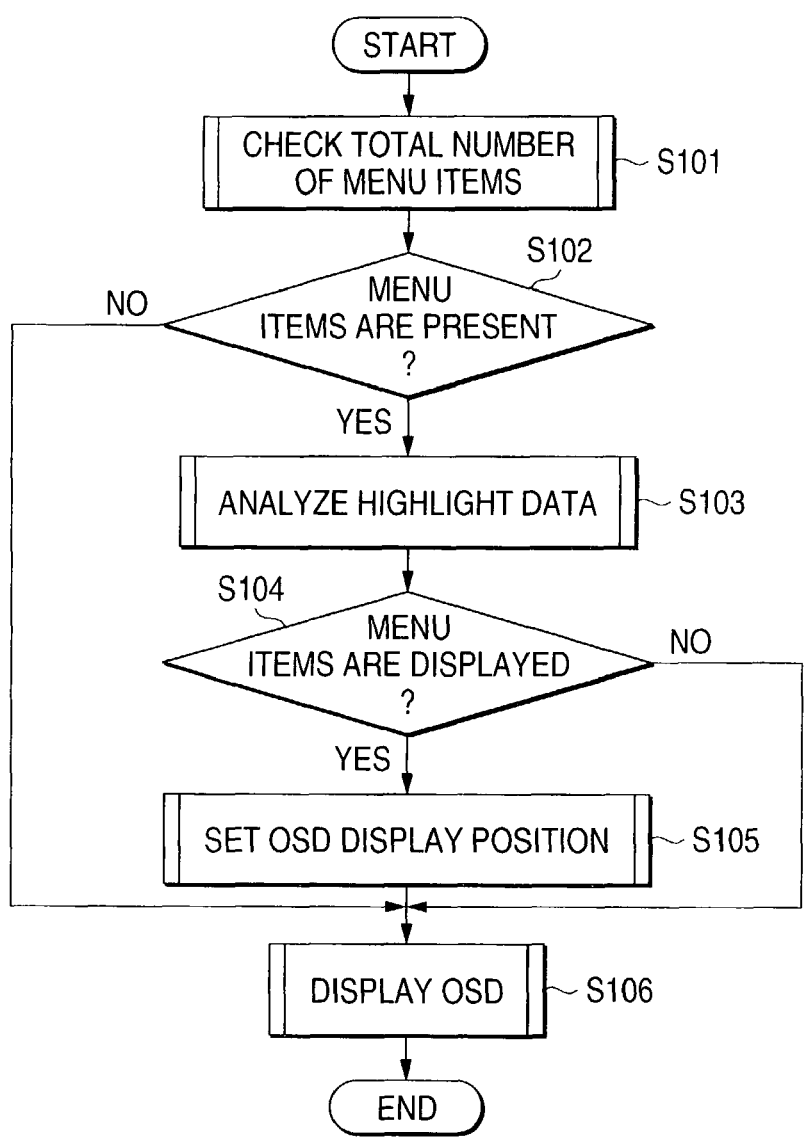
FIG. 5 is a flowchart showing one example of an operation according to display position control processing of OSD by the DVD player 1.

As shown in FIG. 5, when display position control processing of OSD is started, the main control part 18 of the DVD player 1 acquires the amount of data about menu items of a main menu screen within video data of the DVD video D1 read out by the disk drive 17, and checks the total number of menu items of the main menu screen (step S101). Then, based on a result of checking the total number of menu items of the main menu screen, the main control part 18 determines whether or not the menu items of the main menu screen capable of display are present within the video data of the DVD video D1 (step S102).

When the main control part 18 decides that the menu items of the main menu screen capable of display are present within the video data of the DVD video D1 (step S102; YES), there is a possibility that the OSD overlaps with the menu items in the main menu screen, so that highlight data overlaid on the menu items is retrieved from the video data of the DVD video D1 and its highlight data is analyzed and display position information in which a highlight is displayed is acquired (stepS103). Then, the main control part 18 determines whether or not the menu items of the main menu screen are displayed on a display screen at present (step S104).

Then, when the main control part 18 decides that the menu items of the main menu screen are displayed on the display screen (step S104; YES), based on the display position information about the highlight acquired in step S103, a display position of the OSD is set so that the OSD is displayed without overlapping with the highlight, that is, the OSD is displayed without overlapping with the menu items of the main menu screen (step S105). Then, the main control part 18 displays the OSD as well as the menu items and the highlight in the set display position on the main menu screen on the display screen, and ends the OSD display position control processing.

On the other hand, when the main control part 18 decides that the menu items of the main menu screen capable of display are absent within the video data of the DVD video D1 in step S102 (step S102; NO) or decides that the menu items of the main menu screen are not displayed on the display screen in step S104 (step S104; NO), there is no possibility that the OSD overlaps with the menu items even though the OSD is displayed on the main menu screen, so that the OSD on the display screen is displayed as it is without setting the display position of the OSD based on the display position information about the highlight, and the OSD display position control processing is ended.

As described above, according to the DVD player 1 of the embodiment, since the display position of the OSD is set based on the display position of the highlight, the OSD can be displayed on the display screen so that the OSD does not overlap with the highlight, that is, the OSD does not overlap with the menu items of the main menu screen on which the highlight is overlaid.

Incidentally, the invention is not limited to the contents of the embodiment described above, and can be changed properly without departing from the subject matter of the invention.

Embodiment 2

The DVD player 1 of the present embodiment decodes video and audio data of DVD video standards to generate a video signal and an audio signal, and retrieves sub-picture data from the video data, and analyzes the sub-picture data, and acquires a display position of a sub-picture on a display screen, and analyzes predetermined On Screen Display (hereinafter called "OSD") data, and acquires a display position of the OSD on the display screen. Then, the DVD player 1 controls the display position of the OSD so that the OSD is displayed in a position different from that of the sub-picture on the display screen based on the display position of the sub-picture and the display position of the OSD. Then, the DVD player 1 displays the OSD in the controlled display position on the display screen and also outputs various audio based on the audio signal while overlaying the OSD on main video, sub-pictures and highlights based on the video signal.

The video data of DVD video standards includes MPEG main video data in which main video of movie or music video works is compressed by MPEG, sub-picture data in which characters of a caption or superimposition are represented by a run-length code, and highlight data.

Incidentally, details will be described below, and even in the case that the OSD overlaps with a sub-picture when the sub-picture and the OSD are displayed on the display screen of the video display apparatus as it is based on the generated RGB video signal (see FIG. 6), since the main control part 18 sets a display position of the OSD so that the OSD does not overlap with the sub-picture, the AV decoder 13 generates an RGB video signal for displaying the OSD so as not to overlap with the sub-picture.

Further, when a display position of the sub-picture overlaps with a display position of the OSD, a case that a part of the sub-picture with which the OSD overlaps becomes invisible due to the OSD occurs.

Further, when the main control part 18 receives operation directions of OSD of a user through the sub-control part 21 described below and decides that sub-picture data is included in the video and audio data, a display position of a sub-picture is analyzed every display area as shown in FIG. 3. Further, the main control part 18 reads OSD data from the flash memory 19 and analyzes a display position of OSD every display area as shown in FIG. 3 in a manner similar to the case of analyzing the display position of the sub-picture.

Figure 6:
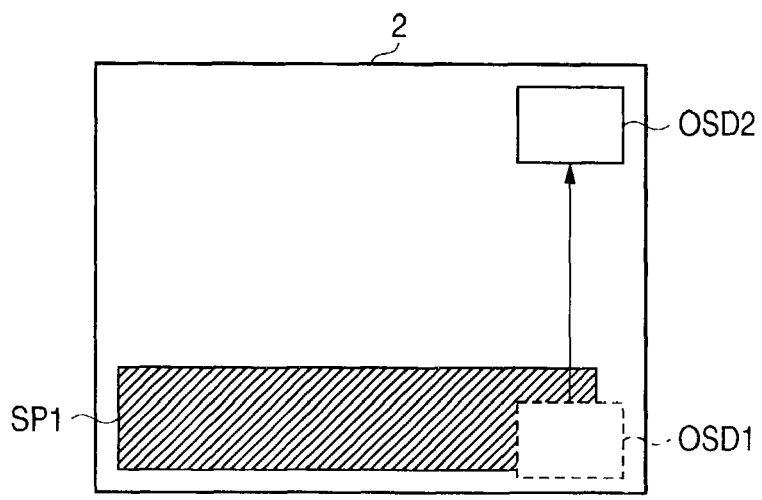
FIG. 6 is a screen example in which a sub-picture and OSD are displayed on the display screen 2 of the video display apparatus.

Then, when the main control part 18 decides that the OSD overlaps with the sub-picture as shown in FIG. 6 as a result of analyzing the display positions of the sub-picture and the OSD, the display position of the OSD is set every display area according to priority predetermined to each the display area as shown in FIG. 3 so that the OSD does not overlap with the sub-picture. Then, the main control part 18 controls the AV decoder 13 so that the AV decoder 13 performs decoding processing with respect to OSD data based on the display position of the OSD and generates an RGB video signal for displaying the OSD.

As described above, in order to analyze a display position of a sub-picture, the main control part 18 analyzes which display area of the display screen 2 the sub-picture is present in.

FIG. 6 is a screen example in which a sub-picture and OSD are displayed on the display screen 2 of the video display apparatus.

As shown in FIG. 6, in the case of attempting to display a sub-picture SP1 which is a sub-picture in a lower portion of the display screen 2, the main control part 18 analyzes a display position of the sub-picture SP1 as display areas 2-7, 2-8 and 2-9. Further, in the case of attempting to display OSD1 which is OSD in the display area 2-9 with the highest priority on the display screen 2, the main control part 18 decides that the OSD1 overlaps with the sub-picture SP1 and sets a display position of the OSD so as to display the OSD in the display area 2-3 with the second highest priority next to that of the display area 2-9 as OSD2. Therefore, on the display screen 2, the sub-picture SP1 is displayed in the display areas 2-7 to 2-9 and the OSD2 is displayed in the display area 2-3, so that a user can view all of the sub-picture and the OSD.

Further, based on control of the main control part 18, the sub-control part 21 measures elapsed time after completing an analysis with respect to video and audio data of the DVD video D1 by the main control part 18, and outputs its measured time to the main control part 18.

Next, display position control processing of OSD executed by the DVD player 1 in the embodiment will be described according to a flowchart shown in FIG. 7.

Figure 7:
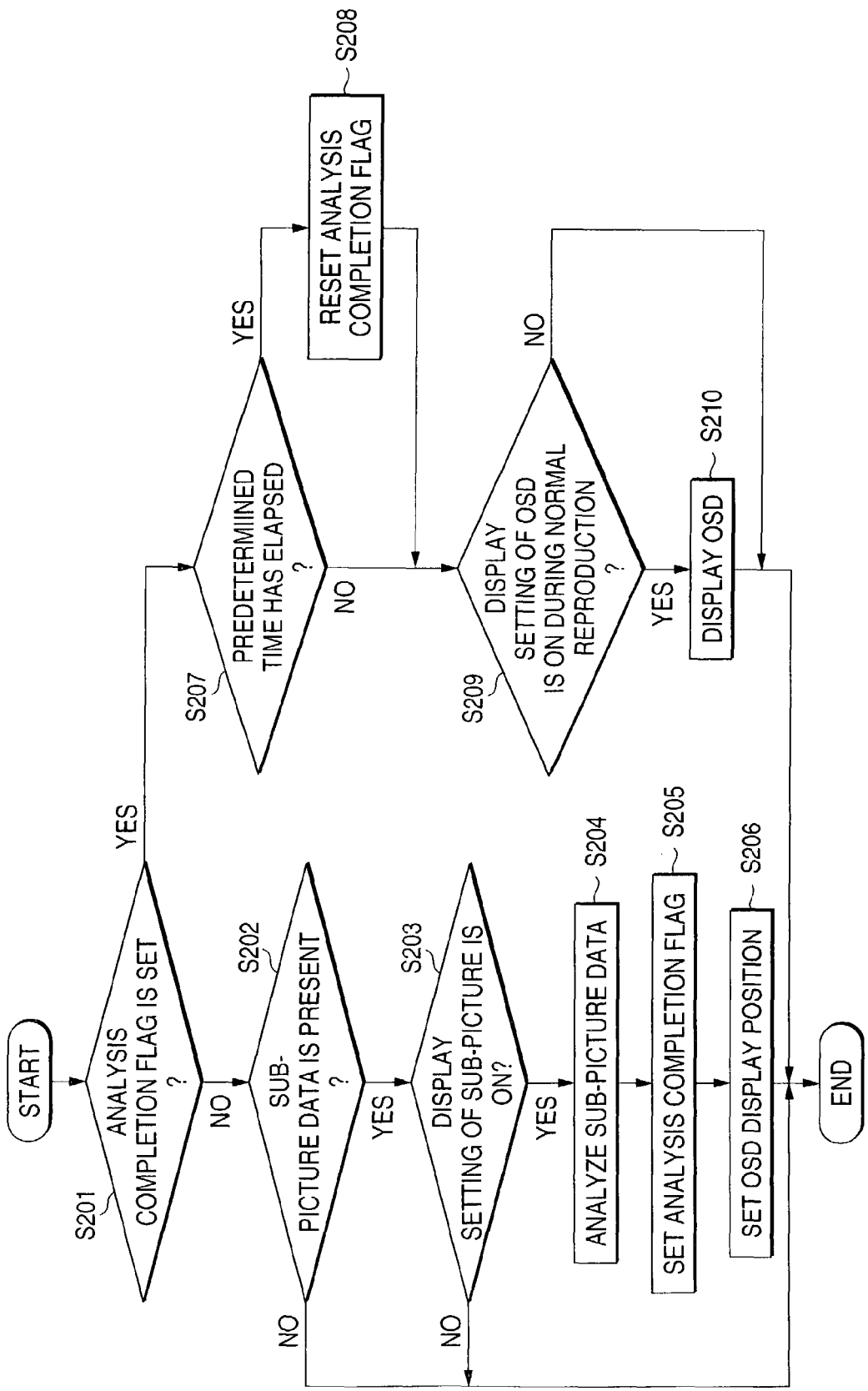
FIG. 7 is a flowchart showing one example of an operation according to display position control processing of OSD by the DVD player 1.

As shown in FIG. 7, when display position control processing of OSD is started, the main control part 18 of the DVD player 1 determines whether or not an analysis completion flag indicating that an analysis with respect to video data of the DVD video D1 read out by the disk drive 17 is completed is set (step S201). Then, when the main control part 18 decides that the analysis completion flag is not set, that is, the analysis with respect to video data of the DVD video D1 is not completed (step S201; NO), it determines whether or not sub-picture data is included in the video data (step S202).

When the main control part 18 decides that the sub-picture data is included in the video data (step S202; YES), it determines whether or not display setting of a sub-picture indicating that the sub-picture is displayed is in an ON state (step S203).

Then, when the main control part 18 decides that the display setting of the sub-picture is in the ON state (step S203; YES), there is a possibility that the OSD overlaps with the sub-picture when the OSD is displayed, so that the sub-picture data is analyzed and display position information in which the sub-picture is displayed is acquired (step S204). Then, the main control part 18 sets the analysis completion flag (step S205), and sets a display position of the OSD so that the OSD is displayed without overlapping with the sub-picture based on the display position information about the sub-picture acquired in step S104 (step S206). Then, the main control part 18 ends the OSD display position control processing.

On the other hand, when the main control part 18 decides that the sub-picture data is not included in the video data in step S102 (step S202; NO) or decides that the sub-picture data is included in the video data but the display setting of its sub-picture is not in the ON state in step S103 (step S203; NO), there is no possibility that the OSD overlaps with the sub-picture even when the OSD is displayed, so that the OSD display position control processing is ended as it is.

When the main control part 18 decides that the analysis completion flag is set, that is, the analysis with respect to the video data of the DVD video D1 is completed in step S201 (step S201; YES), the main control part 18 reads measured time after completing the analysis with respect to the video data of the DVD video D1 from the sub-control part 21 and determines whether or not the measured time exceeds predetermined time (step S207). Then, when the main control part 18 decides that the predetermined time has elapsed after completing the analysis with respect to the video data of the DVD video D1 (step S207; YES), the analysis completion flag is reset.

On the other hand, when the main control part 18 decides that the predetermined time has not elapsed after completing the analysis with respect to the video data of the DVD video D1 (step S207; NO), it proceeds to step S209 without resetting the analysis completion flag.

The main control part 18 determines whether or not display setting of OSD indicating that the OSD is normally displayed in the case of reproducing the video data of the DVD video D1 is in an ON state (step S209). Then, when the main control part 18 decides that the display setting of OSD is in the ON state (step S209; YES), the OSD is displayed in a display position preset (step S210) and the OSD display position control processing is ended.

On the other hand, when the main control part 18 decides that the display setting of OSD is not in the ON state (step S209; NO), the OSD display position control processing is ended without displaying the OSD.

As described above, according to the DVD player 1 of the embodiment, since the display position of the OSD is set based on the display position of the sub-picture, the OSD can be displayed on the display screen so that the OSD does not overlap with the sub-picture.

Incidentally, the invention is not limited to the contents of the embodiment described above, and can be changed properly without departing from the subject matter of the invention.

Embodiment 3

The DVD player 1 of the present embodiment decodes video and audio data of DVD video standards to generate a video signal and an audio signal, and also retrieves and analyzes MPEG video data from the video data, and acquires a display position of a mark on a display screen. Further, the DVD player 1 analyzes predetermined On Screen Display (hereinafter called "OSD") data, and acquires a display position of the OSD on the display screen. Then, the DVD player 1 controls the display position of the OSD so that the OSD is displayed in a position different from that of all the marks of a main menu screen on the display screen based on the display position of the mark and the display position of the OSD. Then, the DVD player 1 displays the OSD in the controlled display position on the display screen and also outputs various audio based on the audio signal while overlaying the OSD on various video such as the main menu screen based on the video signal.

The video data of DVD video standards includes MPEG video data in which main video of movie or music video works and a main menu screen having plural menu items, other marks such as a title and various background images about the main video are compressed by MPEG, sub-picture data in which characters such as a capture or superimposition are represented by a run-length code, and highlight data representing color, position and shape of a highlight showing a state of selection or non-selection of selectable menu items of the main menu screen. Incidentally, the highlight data is data in which the highlight is overlaid on the selectable menu items of the main menu screen, so that the highlight data has data of a position of a highlight matching with a display position of the selectable menu items of the main menu screen and does not have data of a display position of a mark other than the selectable menu items or a position matching with a display position of a picture in various background images.

Incidentally, details will be described below, and even in the case that the OSD overlaps with menu items, other marks and pictures of background images when a main menu screen having menu items, other marks and various background images made of MPEG video and the OSD are displayed on the display screen of the video display apparatus as it is based on the generated RGB video signal (see FIG. 8), since the main control part 18 sets a display position of the OSD so that the OSD does not overlap with them made of MPEG video, the AV decoder 13 generates an RGB video signal for displaying the OSD so as not to overlap with the menu items of the main menu screen.

Therefore, when display positions of menu items, other marks such as a title, or pictures of background images of a main menu screen made of MPEG video overlap with a display position of the OSD, a case that a part of the menu items etc. with which the OSD overlaps becomes invisible due to the OSD occurs.

Further, when the main control part 18 receives operation directions of OSD of a user through the sub-control part 21 described below and decides that data about the menu items of the main menu screen made of MPEG video is included in the video and audio data, MPEG video data is analyzed to acquire display positions of menu items, other marks such as a title and pictures of background images of a main menu screen, that is, display positions of all the marks etc. of the main menu screen including the marks on which a highlight is not overlaid every display area as shown in FIG. 3. Further, the main control part 18 analyzes the MPEG video data, and acquires color information about a background of the main menu screen, and decides which color or pattern a predetermined portion of the main menu screen is.

Further, the main control part 18 reads OSD data from the flash memory 19, and analyzes the OSD data in a manner similar to the case of analyzing the display positions of the menu items, other marks and pictures of background images of the MPEG video, and acquires a display position of OSD and a display size of OSD every display area as shown in FIG. 3. Further, the main control part 18 analyzes the OSD data and acquires color information about OSD.

Figure 8:
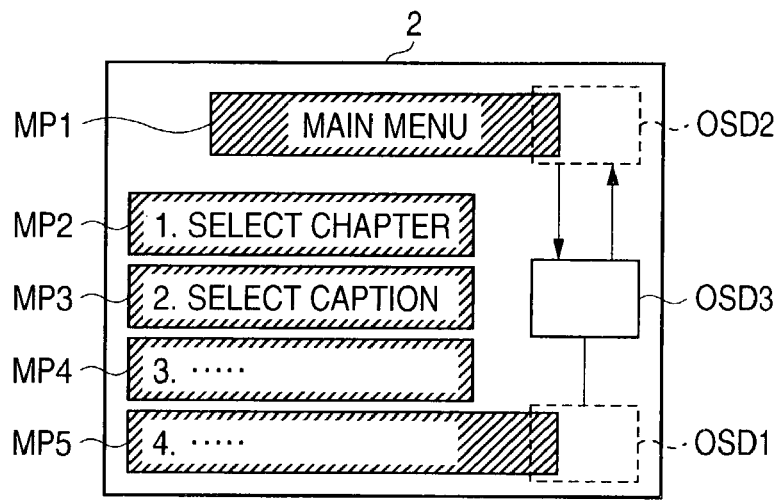
FIG. 8 is a screen example in which a main menu screen and OSD are displayed on the display screen 2 of the video display apparatus.

Then, when the main control part 18 decides that the OSD overlaps with the menu items, other marks or pictures of background images as shown in FIG. 8 based on the display positions of the menu items, other marks and pictures of background images of the main menu screen and the display position and the display size of the OSD, the display position of the OSD is set every display area according to priority predetermined to each the display area as shown in FIG. 3 so that the OSD does not overlap with them. Further, when the main control part 18 decides that color of the OSD is color kindred to background color of the main menu screen in the vicinity of a display position in which the OSD is displayed or a difficult-to-discriminate level of similar color based on the color information about the background of the main menu screen and the color information about the OSD, the color of the OSD is changed to color different from the background color or the display position of the OSD is changed to the display area of a background of color different from the color of the OSD.

Then, as described above, in order to acquire display positions of menu items, other marks and pictures of background images of a main menu screen of MPEG video, the main control part 18 analyzes which display area of the display screen 2 they are present in.

In the embodiment, the case that the display screen 2 of the video display apparatus is divided into the nine display areas and the display position of each the display target is analyzed every this divided display area has been described, but the display screen 2 may be divided into smaller display areas or may be divided into larger display areas. Further, in the embodiment, the case that the highest priority is assigned to the display area 2-9 and the second highest priority is assigned to the display area 2-3 and the third highest priority is assigned to the display area 2-6 has been described, but priority may be assigned to each the display area according to the target to be displayed.

FIG. 8 is a screen example in which menu items of a main menu screen of MPEG video and OSD are displayed on the display screen 2 of the video display apparatus.

As shown in FIG. 8, when the main control part 18 displays a title MP1 "Main Menu", a menu item MP2 "1. Select chapter", a menu item MP3 "2. Select caption", a menu item MP4 "3. . . . ", a menu item MP5 "4. . . . " of a main menu screen which is MPEG video and a background made of kindred color or the same pattern on the display screen 2, a display position of the title MP1 is analyzed as display areas 2-1 to 2-3 and display positions of the menu items MP2 to MP5 are analyzed as display areas 2-1, 2-2, 2-4, 2-5, 2-7 to 2-9.

In the case of attempting to display OSD1 which is OSD in the display area 2-9 with the highest priority on the display screen 2, the main control part 18 decides that the OSD1 overlaps with the menu item MP5 based on a display size of the OSD1. Then, in the case of attempting to display OSD as OSD2 in the display area 2-3 with high priority next to that of the display area 2-9, the main control part 18 decides that the OSD2 overlaps with the title MP1 based on a display size of the OSD2. Then, in the case of attempting to display OSD as OSD3 in the display area 2-6 with high priority next to that of the display area 2-3, the main control part 18 decides that the OSD3 does not overlap with the title MP1, the menu items MP2 to MP5 or other marks based on a display size of the OSD3 and color of the OSD3 is not color kindred or similar to color of a background of the display area 2-6, and sets a display position of the OSD in a display position of the OSD3. Therefore, on the main menu screen of the display screen 2, the title MP1 can be displayed in the display areas 2-1 to 2-3 and the menu items MP2 to MP5 can be displayed in the display areas 2-1, 2-2, 2-4, 2-5, 2-7 to 2-9 and the OSD3 can be displayed in the display area 2-6, so that the OSD3 does not overlap with the title, menu items, other marks and pictures of background images of MPEG video. Consequently, a user can view all of the marks of the main menu screen of MPEG video and all of the OSD.

Next, display position control processing of OSD executed by the DVD player 1 in the embodiment will be described according to a flowchart shown in FIG. 9.

Figure 9:
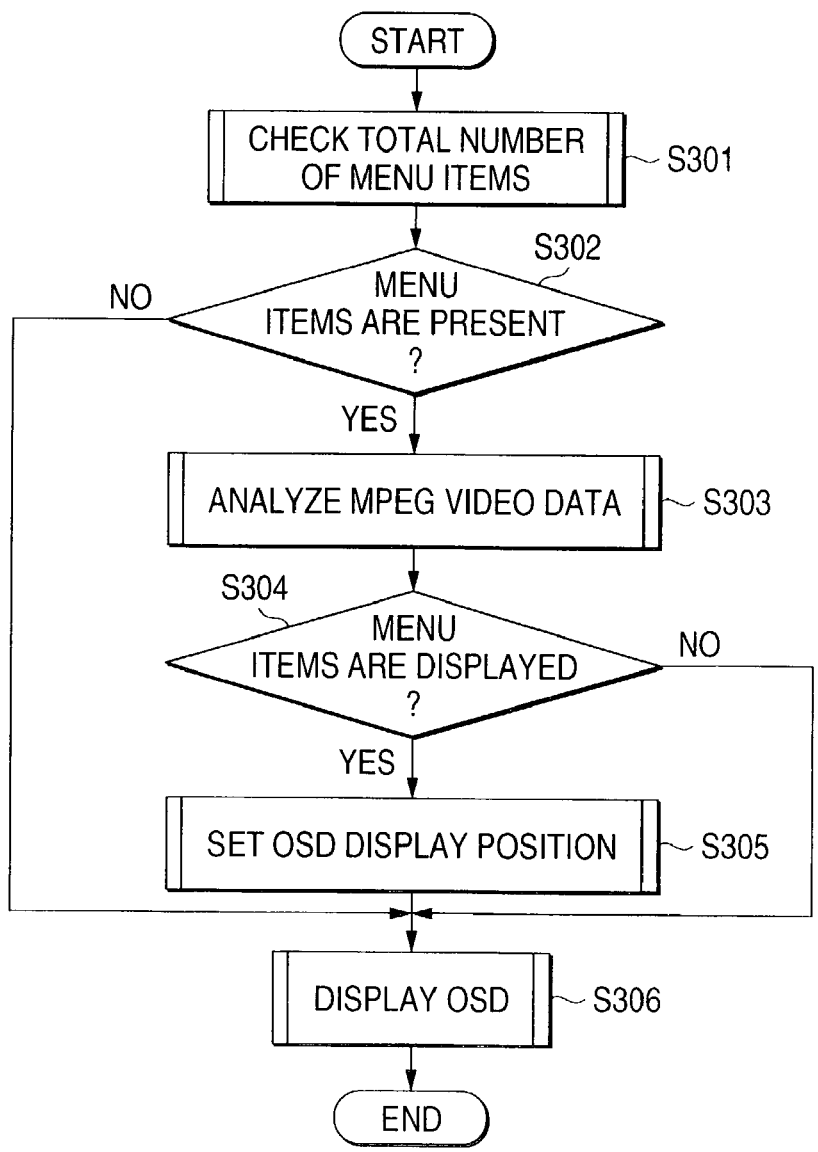
FIG. 9 is a flowchart showing one example of an operation according to display position control processing of OSD by the DVD player 1.

As shown in FIG. 9, when display position control processing of OSD is started, the main control part 18 of the DVD player 1 acquires the amount of data about menu items of a main menu screen in MPEG video data within video data of the DVD video D1 read out by the disk drive 17, and checks the total number of menu items of the main menu screen (step S301). Then, based on a result of checking the total number of menu items of the main menu screen, the main control part 18 determines whether or not the menu items of the main menu screen capable of display are present within the MPEG video data of the video data of the DVD video D1 (step S302).

When the main control part 18 decides that the menu items of the main menu screen capable of display are present within the MPEG video data of the video data of the DVD video D1 (step S302; YES), there is a possibility that the OSD overlaps with the menu items in the main menu screen, so that the MPEG video data about the main menu screen is retrieved from the video data of the DVD video D1 and its MPEG video data is analyzed and display position information in which menu items, other marks and pictures of background images of the main menu screen are displayed is acquired and also color information about a background of the main menu screen is acquired (step S303). Then, the main control part 18 determines whether or not the menu items of the main menu screen are displayed on a display screen at present (step S304).

Then, when the main control part 18 decides that the menu items of the main menu screen are displayed on the display screen (step S304; YES), a display position of the OSD is set so that the OSD is displayed without overlapping with the menu items, other marks and pictures of background images while considering a display size of the OSD based on the display position information about the menu items, other marks and pictures of background images acquired in step S303. Further, when the main control part 18 decides that general color of the OSD is color kindred to background color in the vicinity of a display position in which the OSD is displayed or a difficult-to-discriminate level of similar color based on the color information about the background of the main menu screen acquired in step S103, precedence to the set display position of the OSD is given and the general color of the OSD is changed from the background color to color capable of discrimination and the OSD of the changed color is displayed in the as-is display position, or precedence to the general color of the OSD is given and the display position of the OSD is changed to a display position of a background of color different from color of the OSD and the OSD of the as-is color is displayed in the changed display position (step S305).

Then, the main control part 18 displays the OSD as well as the menu items, other marks and pictures of background images in the set display position on the main menu screen on the display screen, and ends the OSD display position control processing.

On the other hand, when the main control part 18 decides that the menu items of the main menu screen capable of display are absent within MPEG video data of the video data of the DVD video D1 in step S302 (step S302; NO) or decides that the menu items of the main menu screen are not displayed on the display screen in step S304 (step S304; NO), there is no possibility that the OSD overlaps with the menu items even though the OSD is displayed on the main menu screen, so that the OSD on the display screen is displayed as it is without setting the display position of the OSD based on the display position information about the menu items, and the OSD display position control processing is ended.

As described above, according to the DVD player 1 of the embodiment, since the display position of the OSD is set based on the display positions of the menu items, other marks such as a title and pictures of background images of the main menu screen made of MPEG video, the OSD can be displayed on the display screen so that the OSD does not overlap with all the marks of the main menu screen.

Incidentally, the invention is not limited to the contents of the embodiment described above, and can be changed properly without departing from the subject matter of the invention.

According to a video processing apparatus and a video processing method of the invention, by analyzing highlight data having position data of a highlight, on screen display can be displayed on a main menu screen without overlapping with a menu item easily more than analyzing MPEG video data or sub-picture data having character data of the menu item of the main menu screen on which the highlight is overlaid. Thus, even when the on screen display of a sound volume adjusting bar is displayed in the case that a menu item such as chapter selection or caption selection is displayed on a main menu screen of a movie, without the fact that the sound volume adjusting bar overlaps with the menu item and it becomes difficult for a user to view the menu item, an easy-to-view display screen can be provided for the user by simpler processing.

Further, according to the video processing apparatus of the invention, since display positions of the highlight and the on screen display are respectively acquired every display area and the display position of the on screen display can be changed every the display area so that the on screen display does not overlap with the highlight, acquisition processing and change processing of the display position can be performed more easily and rapidly. Thus, even when the on screen display is frequently displayed on the main menu screen having the menu item on which the highlight is overlaid, the display position of the on screen display can be set rapidly and an easy-to-view display screen can always be provided for the user.

Further, according to the video processing apparatus of the invention, by previously assigning priority to plural display areas on a display screen in consideration of a frequency with which the highlight is displayed every display area, the display area of the on screen display can be changed more easily and rapidly so that the on screen display does not overlap with the highlight, that is, the on screen display does not overlap with the menu item of the main menu screen.

According to a DVD video apparatus of the invention, by analyzing highlight data having position data of a highlight, on screen display can be displayed on a main menu screen without overlapping with a menu item easily more than analyzing MPEG video data or sub-picture data having character data of the menu item of the main menu screen on which the highlight is overlaid. Thus, an easy-to-view display screen can be provided for a user by simpler processing.

Further, according to a video processing apparatus and a video processing method of the invention, a display position of on screen display can be controlled based on a display position of a sub-picture, so that the on screen display can be displayed on a display screen without overlapping with the sub-picture. Thus, even when the on screen display of a sound volume adjusting bar is displayed on the display screen on which a sub-picture such as a caption of a movie is displayed, without the fact that the sound volume adjusting bar overlaps with the caption and a user cannot read the caption, an easier-to-view display screen can be provided for the user.

Further, according to the video processing apparatus of the invention, since the display positions of the sub-picture and the on screen display are respectively acquired every the display area and the display position of the on screen display can be changed every the display area so that the on screen display does not overlap with the sub-picture, acquisition processing and change processing of the display position can be performed more easily and rapidly. Thus, even when the on screen display is frequently displayed on the display screen on which the sub-picture is displayed, the display position of the on screen display can be set rapidly and an easy-to-view display screen can always be provided for a user.

Further, according to the video processing apparatus of the invention, by previously assigning priority to the plural display areas on the display screen in consideration of a frequency with which the sub-picture is displayed every display area, the display area of the on screen display can be changed more easily and rapidly so that the on screen display does not overlap with the sub-picture.

According to a DVD video apparatus of the invention, the display position of the on screen display can be controlled based on the display position of the sub-picture, so that the on screen display can be displayed on the display screen without overlapping with the sub-picture. Thus, an easier-to-view display screen can be provided for a user.

Still further, according to a video processing apparatus and a video processing method of the invention, by analyzing MPEG video data, a display position can be acquired also with respect to marks incapable of acquiring its display position from a display position of a highlight, so that on screen display can be displayed on a main menu screen without overlapping with all the marks of the main menu screen. Thus, even when the on screen display of a sound volume adjusting bar is displayed in the case that a title and a menu item such as chapter selection or caption selection are displayed on the main menu screen of a movie, without the fact that the sound volume adjusting bar overlaps with the title or the menu item and it becomes difficult for a user to view them, an easy-to-view display screen can be provided for the user surely.

Further, according to the video processing apparatus of the invention, since display positions of a mark of MPEG video and the on screen display are respectively acquired every display area and the display position of the on screen display can be changed every the display area so that the on screen display does not overlap with the mark of MPEG video, acquisition processing and change processing about the display positions of all the marks of the main menu screen can be performed more easily and rapidly without depending on a display position of a highlight capable of acquisition easily. Thus, even when the on screen display is frequently displayed on the main menu screen having the marks on which the highlight cannot be overlaid, the display position of the on screen display can be set rapidly based on the display positions of all the marks on the main menu screen and an easy-to-view display screen can always be provided for a user.

Further, according to the video processing apparatus of the invention, by previously assigning priority to the plural display areas on the display screen in consideration of a frequency with which the mark of MPEG video is displayed every display area, the display area of the on screen display can be changed more easily and rapidly so that the on screen display does not overlap with all the marks of the main menu screen.

Further, according to the video processing apparatus of the invention, even when color of the on screen display displayed on the main menu screen is color kindred to background color of the main menu screen in the vicinity of a display position in which the on screen display is displayed or a difficult-to-discriminate level of color similar to the background color, a display position of the on screen display can be changed to a display position having a background of color different from color of the on screen display, or color of the on screen display can be changed to color different from the background color. Thus, the on screen display can always be displayed on the main menu screen in a state in which a user can view easily.

According to a DVD video apparatus of the invention, by analyzing the MPEG video data, a display position can be acquired also with respect to marks incapable of acquiring its display position from a display position of a highlight, so that the on screen display can be displayed on the main menu screen without overlapping with all the marks of the main menu screen. Thus, an easy-to-view display screen can be provided for a user surely.

What is claimed is:
1. A video processing apparatus comprising:
a highlight analysis section configured to receive highlight data from video data conforming to DVD video standards and analyze the highlight data to acquire a display position of a highlight on a display screen areas divided into a plurality of display areas with which respective priorities are associated,
an on screen display analysis section configured to analyze predetermined on screen display data to acquire a display position of an on screen display on the display screen, and an on screen display control section configured to change the display position of the on screen display, wherein when the display position of the on screen display overlaps with the display position of the highlight in terms of the display areas, the on screen display control section automatically changes the display position of the on screen display from one of the display areas to another of the display areas which has the highest priority in some of the display areas not including the display position of the highlight so that the on screen display does not overlap with the highlight.

2. A video processing method comprising:

retrieving highlight data from video data conforming to DVD video standards and analyzing the highlight data to acquire a display position of a highlight on a display screen, the display screen divided into a plurality of display areas with which respective priorities are associated, analyzing predetermined on screen display data to acquire a display position of an on screen display on the display screen, and when the display position of the on screen display overlaps with the display position of the highlight in terms of the display areas, automatically changing the display position of the on screen display from one of the display areas to another of the display areas which has the highest priority in some of the display areas including the display position of the highlight so that the on screen display does not overlap with the highlight.

3. A DVD video apparatus comprising:

the video processing apparatus as defined in claim 1, a decoder configured to decode the video data and audio data which conform to the DVD video standards and generate a video signal and an audio signal based on the video and audio data, a video display section configured to display various video based on the video signal in a predetermined position on the display screen, an audio output section configured to output various audio based on the audio signal, and an on screen display section configured to display the on screen display on the display screen while overlaying the on screen display on the various video based on the video signal.

4. A video processing apparatus comprising:

highlight analysis means for retrieving highlight data from video data conforming to DVD video standards and analyzing the highlight data to acquire a display position of a highlight on a display screen divided into a plurality of display areas with which respective priorities are associated, on screen display analysis means for analyzing predetermined on screen display data to acquire a display position of an on screen display on the display screen, and on screen display control means for changing the display position of the on screen display, wherein when the display position of the on screen display overlaps with the display position of the highlight in terms of the display areas, the on screen display control means automatically changes the display position of the on screen display from one of the display areas to another of the display areas which has the highest priority in some of the display areas not including the display position of the highlight so that the on screen display does not overlap with the highlight.

5. A DVD video apparatus comprising:

the video processing apparatus as defined in claim 4, decoding means for decoding the video data and audio data which conform to the DVD video standards and generating a video signal and an audio signal based on the video and audio data, video display means for displaying various video based on the video signal in a predetermined position on a display screen, audio output means for outputting various audio based on the audio signal, and an on screen display means for displaying the on screen display on the display screen while overlaying the on screen display on the various video based on the video signal.

* * * * *